United States Patent
Hijazi et al.

(10) Patent No.: US 10,795,421 B2
(45) Date of Patent: Oct. 6, 2020

(54) POWER TRANSFER SYNCHRONIZATION FOR INFORMATION HANDLING SYSTEM AND EXTERNAL DEVICE

(71) Applicant: Dell Products L.P., Round Rock, TX (US)

(72) Inventors: Mohammed Hijazi, Austin, TX (US); Merle J. Wood, III, Round Rock, TX (US); Marcin Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 15/669,327

(22) Filed: Aug. 4, 2017

(65) Prior Publication Data

US 2019/0041935 A1 Feb. 7, 2019

(51) Int. Cl.
*G06F 1/26* (2006.01)
*G06F 13/42* (2006.01)
*G06F 1/3296* (2019.01)
*G06F 1/3287* (2019.01)

(52) U.S. Cl.
CPC .............. *G06F 1/266* (2013.01); *G06F 1/263* (2013.01); *G06F 1/3287* (2013.01); *G06F 1/3296* (2013.01); *G06F 13/42* (2013.01)

(58) Field of Classification Search
CPC ....... G06F 1/266; G06F 1/3287; G06F 1/3296
See application file for complete search history.

(56) References Cited

U.S. PATENT DOCUMENTS

| | | | |
|---|---|---|---|
| 2010/0298029 A1* | 11/2010 | Jang | G06F 1/266 455/557 |
| 2014/0025999 A1* | 1/2014 | Kessler | H04L 12/40045 714/43 |
| 2016/0141822 A1* | 5/2016 | Hijazi | H01R 13/6595 361/679.31 |
| 2016/0163480 A1* | 6/2016 | Lester | G06F 13/00 713/300 |
| 2016/0216750 A1* | 7/2016 | Hundal | G06F 1/266 |
| 2017/0293333 A1* | 10/2017 | Liu | G06F 1/266 |

* cited by examiner

*Primary Examiner* — Jaweed A Abbaszadeh
*Assistant Examiner* — Gayathri Sampath
(74) *Attorney, Agent, or Firm* — Norton Rose Fulbright US LLP

(57) ABSTRACT

An external device and an information handling system may be attached through a single port connection to provide bi-directional transfer or data and power through the port connection. The port connector may allow the information handling system to function as both a power source and a power sink. This allows the information handling system to provide power to certain external devices from an internal battery to avoid data corruption when power to an external device is unexpectedly lost. When AC power is restored to the external device, the information handling system may be reconfigured to not transmit power to the external device and to receive power from the external device to operate the information handling system.

20 Claims, 7 Drawing Sheets

POWER TRANSFER SYNCHRONIZATION FOR INFORMATION HANDLING SYSTEM AND EXTERNAL DEVICE

FIELD OF THE DISCLOSURE

The instant disclosure relates to information handling systems. More specifically, portions of this disclosure relate to power supplies for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a port for connecting to external devices. External devices provide additional features for use with the information handling system while attached to the information handling system. One example external device is a dock. A dock, such as illustrated in FIG. 1, may provide a base 102 for holding the information handling system 104, may provide additional ports for interfacing devices 108 with the information handling system 104, and/or may provide power 106 for operating the information handling system 104. The dock, or other external device, may transfer data to and from the information handling system. If power at the dock is unexpectedly interrupted while a data transfer is in progress then data may be lost. Some conventional solutions provide for transfer of power over the port connector. However, the power transfer is restricted to low-power or low-voltage transfer.

SUMMARY

An external device and an information handling system may be attached through a single port connection to provide bi-directional transfer or data and power through the port connection. The port connector may allow the information handling system to function as both a power source and a power sink. This allows the information handling system to provide power to certain external devices from an internal battery to avoid data corruption when power to an external device is unexpectedly lost. When AC power is restored to the external device, the information handling system may be reconfigured to not transmit power to the external device and/or to receive power from the external device to operate the information handling system.

One example external device is a dock, also referred to as a docking station. The dock includes many components and/or ports that may consume a large amount of power. For example, a dock may be used to power and interface with multiple external components including DVD drives, cellular phones, and other USB devices. Additionally, a dock may include high power processors, such as a discrete graphics processor. The dock may have an external power source to provide power to these components and devices. When an information handling system is attached to the dock, such as through a connector or interface, the system may read and/or write data from components of or devices attached to the dock. If power at the dock is lost during a read/write operation, the data may be lost. Likewise, if the system relies on the graphics processor of the dock a power failure at the dock will result in loss of the system display. Power may be provided from the information handling system to the dock to prevent such loss of data and functionality. The information handling system may provide power from an internal battery, external battery, or attached AC adaptor. Examples described below illustrate the use of an internal battery for powering the dock or other external device. The power may be provided over the same port connector used to transfer data between the system and the external device.

The information handling system and the external device may include controllers and other hardware, firmware, and/or software for powering itself and for communicating between the system and the device to coordinate hand-off of power transfer. Such hardware may include a port controller, embedded controller (EC), basic input/output system (BIOS), and/or I2C-to-GPIO converters. These components may coordinate transfer of power supply for an external device from the information handling system back to an external power supply. One method for this transfer includes receiving power for operating the external device from the system; detecting an availability of external power for operating the external device; and transitioning from receiving power from the attached system to the external power. The transition may include transmitting, by the external device, a message to the attached system of the upcoming transition; receiving an acknowledgement of the message from the attached system; and activating an input path for the external power a predetermined time after receiving the acknowledgement.

The timing of steps in the transition from one power supply to another power supply is important to prevent interruption in power to the components and devices. For example, if the dock waits too long to activate a power path from the attached external power supply, then power from the attached system will have been disconnected and the dock will still experience a momentary loss in power that could result in a loss of data or functionality. However, if the external power supply is activated too soon there may be a reverse current condition that could damage the battery or other electronics in the attached system. Thus, a handshake procedure with specific timings may be used to perform the transition. The attached information handling system may include specific hardware to provide transition times that satisfy the timing requirements of the transition. For example, the system may include an I2C-to-GPIO converter that controls switches in the power path between the system's battery and the port connector to the dock. The I2C-to-GPIO converter can respond in sufficient time to prevent the reverse current condition from occurring and damaging the internal battery. The system may be configured to pre-bias on a passing MOSFET to be able to power the attached device quickly and/or configured to turn on a blocking MOSFET quickly upon sensing a loss of power in the attached device. In some embodiments, when power is re-applied to attached device, the attached device does not provide power back to the system immediately, but rather holds off providing power back to system. The system may operate from its internal battery during a transition in these embodiments.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Furthermore, information handling systems may include a variety of hardware and software components that may be configured to provide or consume power from various sources.

Embodiments of this disclosure describe hardware and software components used to manage the supply of power between multiple power sources, such as to allow the supply of power from an information handling system to an external device and to assist in the transition of supplying power from the information handling system to an external power supply for the external device. The ability to provide power from the information handling system to an attached external device, such as a dock, improves the reliability and functionality of the system and the external device. An example method for providing power to the device from the system and transitioning between power sources is described with reference to FIG. 2.

Figure 1:
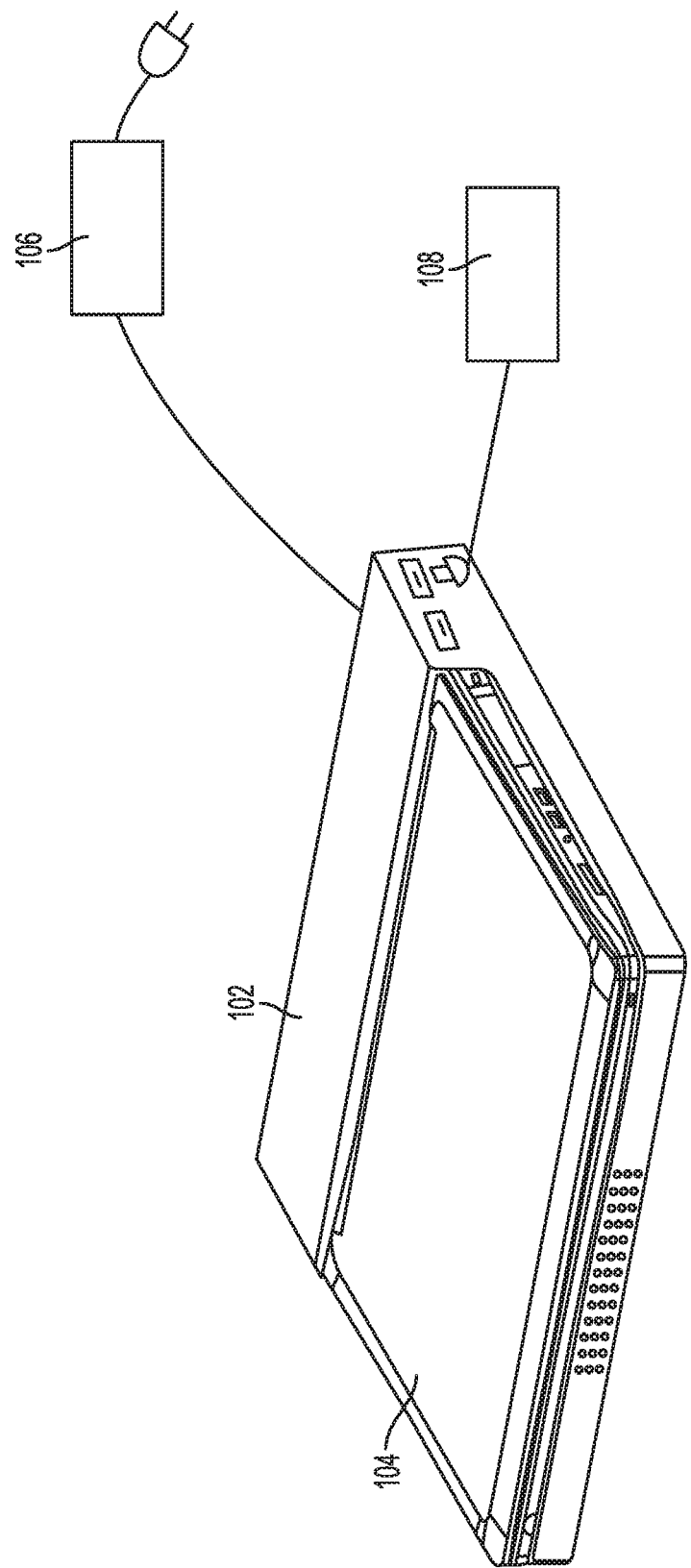
FIG. 1 is a perspective view illustrating an information handling system in a dock.
Figure 2:
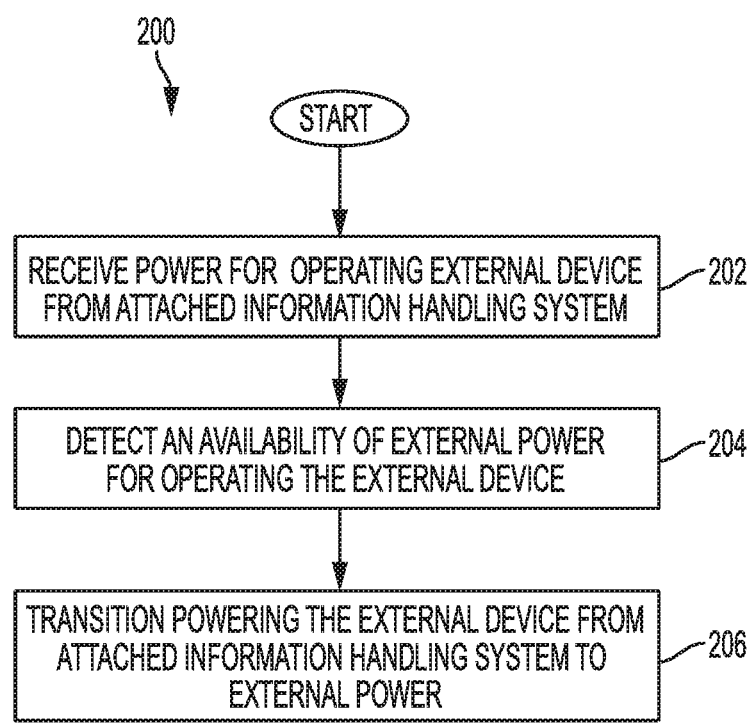
FIG. 2 is a flow chart illustrating an example method for operating an external device to change power sources according to some embodiments of the disclosure.

FIG. 2 is a flow chart illustrating an example method for operating an external device to change power sources according to some embodiments of the disclosure. A method 200 begins at block 202 with receiving power for operating an external device from an attached information handling system. The device may be powered from the system at block 202 due to a failure of the external power source for the device, such as by an accidental unplugging or temporary AC mains power failure. When the power failure is resolved, such as by plugging the device into an active wall outlet, the device may detect, at block 204, an availability of external power for operating the device. The detection at block 204 may include testing on the condition of the external power to meet certain requirements, such as remaining above a minimum voltage threshold for a certain period of time. The device may then transition, at block 206, from powering the external device from the attached information handling system to powering the device from the external power detected at block 204. The transition of block 206 may involve a combination of hardware and software control algorithms so that power can be managed between attached device and a host computer to support the source back feature. In some embodiments, the source back feature and transitions to and from the source back feature may be supported through a limited connector/signal interface using industry standard connectors and without a dedicated pin for passing a control signal. For example, a control signal may be encoded for transfer over the industry standard connector over any available communication protocol.

Figure 3:
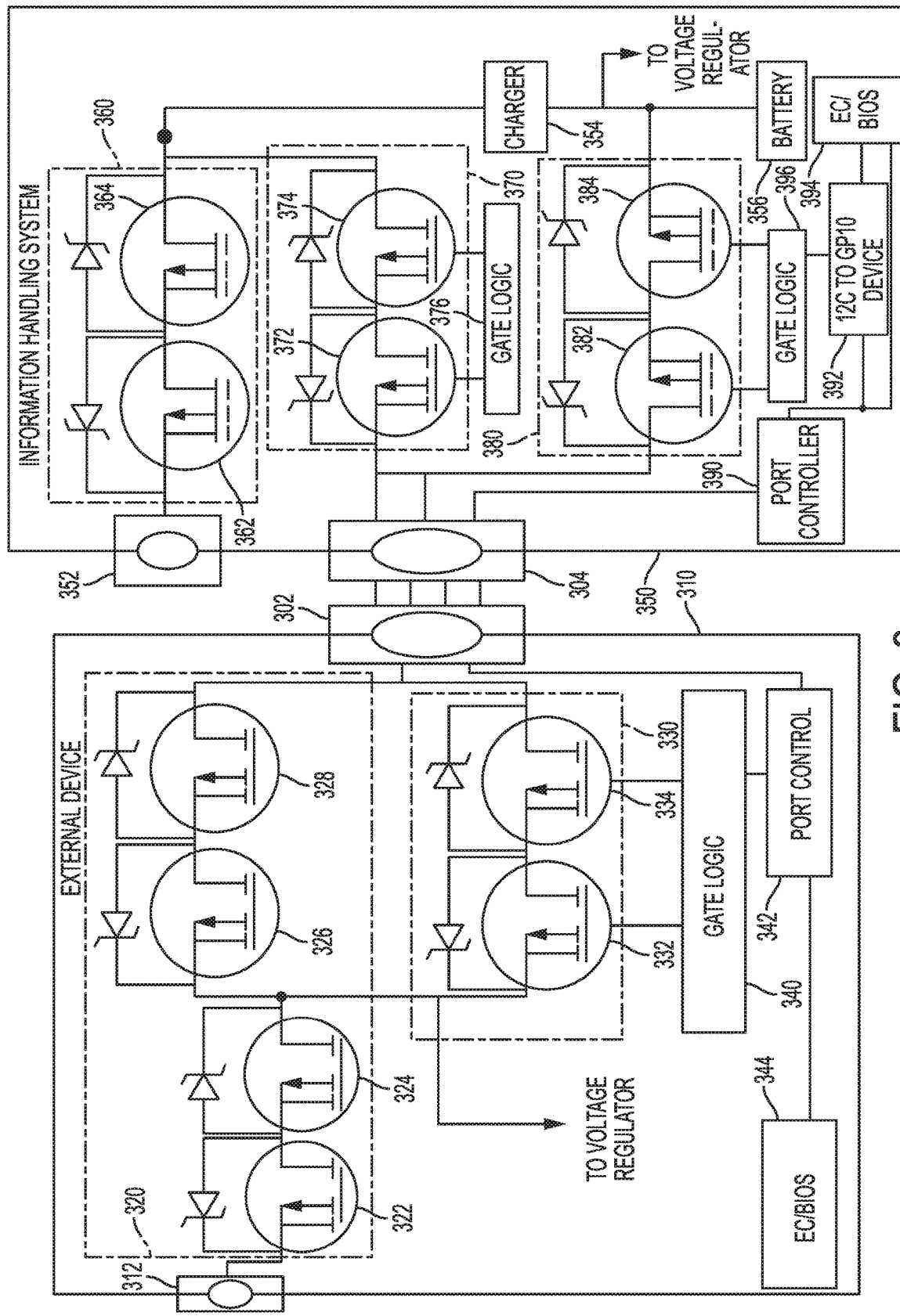
FIG. 3 is a circuit schematic illustrating example circuitry for reconfiguring power sources of an external device according to some embodiments of the disclosure.

Example circuitry for managing power sources and performing the transition is shown in FIG. 3. FIG. 3 is a circuit schematic illustrating example circuitry for reconfiguring power sources of an external device according to some embodiments of the disclosure. An external device, such as dock 310, is coupled to an information handling system 350 through port connectors 302 and 304. A single cable may couple the port connectors 302 and 304 and provide for power transfer and data transfer. In some embodiments, the port connectors 302 and 304 may directly connect without a cable, such as by placing the system 350 into the dock 310. The device 310 and the system 350 may include external power connector 312 and 352, respectively, such as a barrel plug connector. Additionally, the system 350 may include an internal battery 356. Any of these power sources may be used to provide power to one or both of the device 310 and the system 350. For example, during ordinary use the dock 310 may be plugged into a wall through power connector 312. Power may flow from the connector 312 to operate the device 310 and through the connectors 302 and 304 to power the system 350. If power is lost at connector 312, the battery 356 may provide power to the system 350 and power may flow through the connectors 304 and 302 to power the device 310. When power reappears as connector 312, the device 310 and the system 350 may transition to disconnect the battery 356 and provide power flow from the connector 312 for the device 310 and the system 350. Additional details regarding each of these operating modes is described with reference to FIG. 4, FIG. 5, and FIG. 6.

Figure 4:
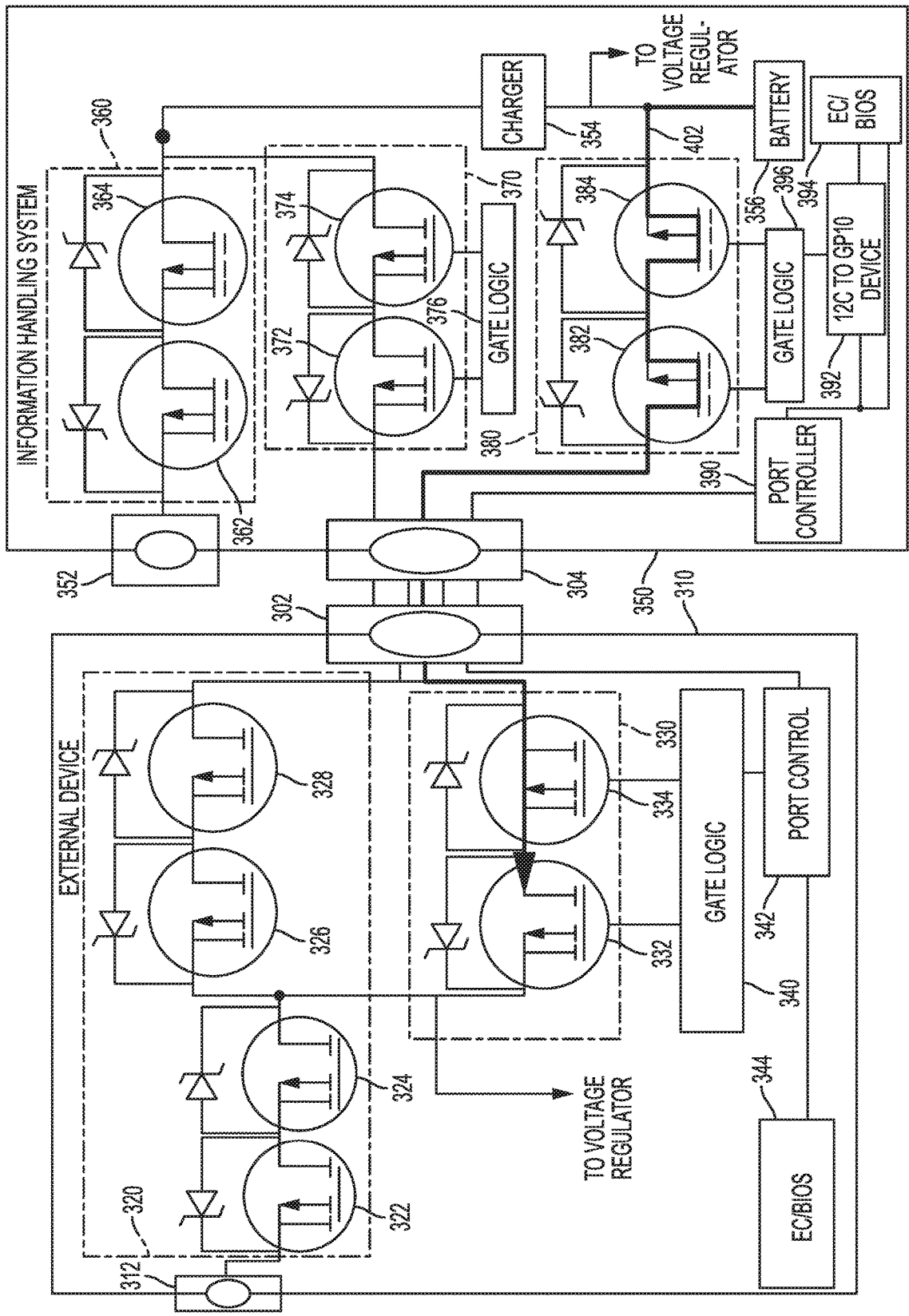
FIG. 4 is a circuit schematic illustrating power flow from an information handling system to an external device according to some embodiments of the disclosure.

Block 202 of FIG. 2 describes the device 310 receiving power from the system 350. FIG. 4 is a circuit schematic illustrating power flow from an information handling system to an external device according to some embodiments of the disclosure. In this operating mode power 402 flows from the battery 356 through a power path 380 to the connector 304, across a cable to connector 302, and through a power path 330 to a voltage regulator for the device 310. The voltage regulator receives the power and may perform conditioning and voltage before supplying power to components of the device 310. The received power 402 may be a voltage higher than a conventional port, such as higher than 5 Volts. The power path 380 may include switches 382 and 384 controlled by gate logic 396, I2C-to-GPIO device 392, port controller 390, and/or EC/BIOS 394. In a conducting state, switches 382 and 384 allow power to flow from the battery 356 to the connector 304. The switch 382 may be a passing MOSFET; the switch 384 may be a blocking MOSFET. The system 350 also includes other power paths 360 and 370. Power path 360 may allow application of external power at connector 352 to power the charger 354 for charging the battery 356 and supplying power to the system 350. Power path 370 may allow power to flow from the connector 204 to the charger 354 for charging the battery 256 and supplying power to the system 350. Power path 370 includes switches 372 and 374 controlled by gate logic 376, I2C-to-GPIO device 392, port controller 390, and/or EC/BIOS 394. The switches 372 and 374 are placed in a non-conducting state when power is supplied from the battery 356 to the device 310. Likewise, switches 362 and 364 of power path 360 are also placed in a non-conducting state when power is supplied from the battery 356 to the device 310. In the device 310, power path 330 may include switches 332 and 334 configured to couple the connector 302 to the voltage regulator under control of the port controller 342 and/or the EC/Bios 344. The switches 332 and 334 are placed in a conducting state to supply power from the battery 356 to the device 310. Switches 322, 324, 326, and 328 of power path 320 are placed in a non-conducting state to prevent application of power at connector 312 from disrupting supply from the battery 356. The switches 322, 324, 326, and 328 may be controlled by a port controller 342 and/or an EC/BIOS 344.

Figure 5:
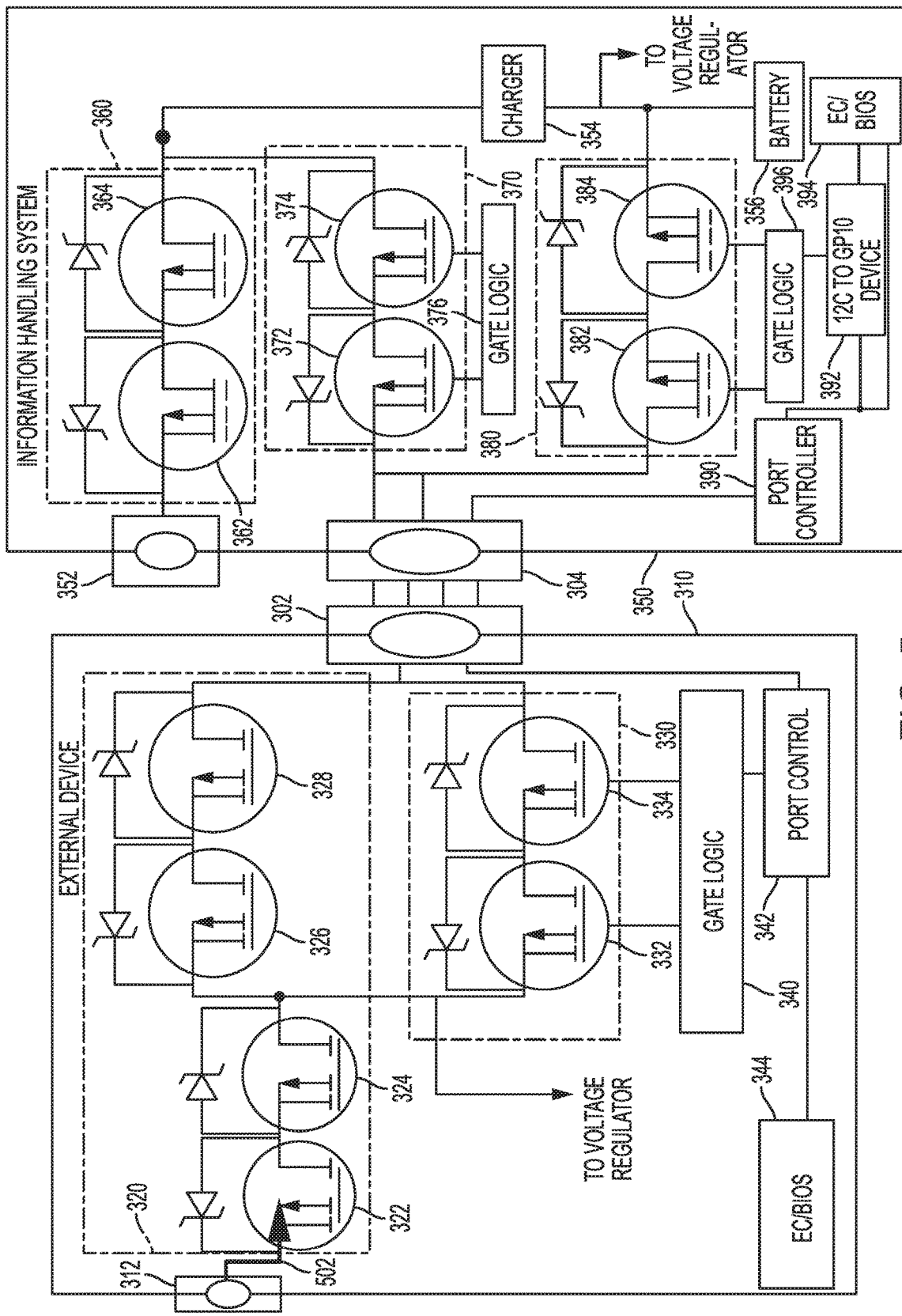
FIG. 5 is a circuit schematic illustrating attachment of an external power supply to the external device according to some embodiments of the disclosure.

During operation of the device 310 from the battery 356, external power may be connected at connector 312. FIG. 5 is a circuit schematic illustrating attachment of an external power supply to the external device according to some embodiments of the disclosure. After connection of the external power, power 502 flows from the connector 312 into power path 320. However, no power is applied to the device 310 because the switches 322, 324, 326, and 328 are in a non-conducting state. The device 310 may perform testing on the power supply connected, such as by communicating with the external power supply to obtain a PSID and verifying the correct supply is attached. FIG. 5 illustrates the availability of external power for operating the external device as illustrated at block 204 of FIG. 2.

Figure 6:
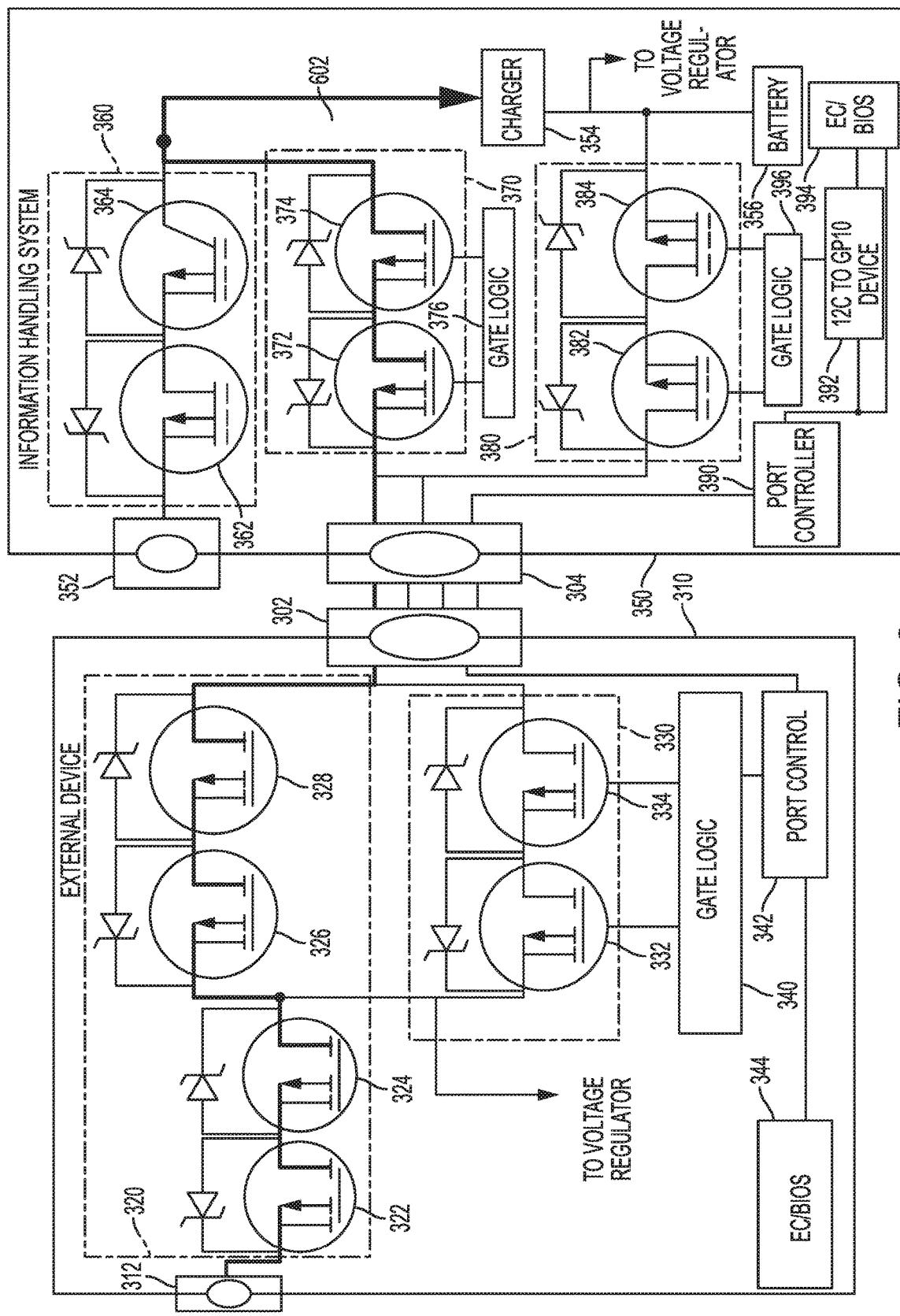
FIG. 6 is a circuit schematic illustrating power flow from an external device to the attached system according to some embodiments of the disclosure.

After detection of the external power, the power source may be transitioned to the external power source at block 206. The result of the transition is shown in FIG. 6. FIG. 6 is a circuit schematic illustrating power flow from an external device to the attached system according to some embodiments of the disclosure. After transition, power 602 flows from connector 312 through power path 320 to connector 302, through a cable to connector 304 and through power path 370 to the charger 354. During the transition, the switches 382 and 384 are set to a non-conducting state to prohibit reverse current into the battery 356. Also during the transition, the switches 332 and 334 of the device 310 are set to a non-conducting state.

Figure 7:
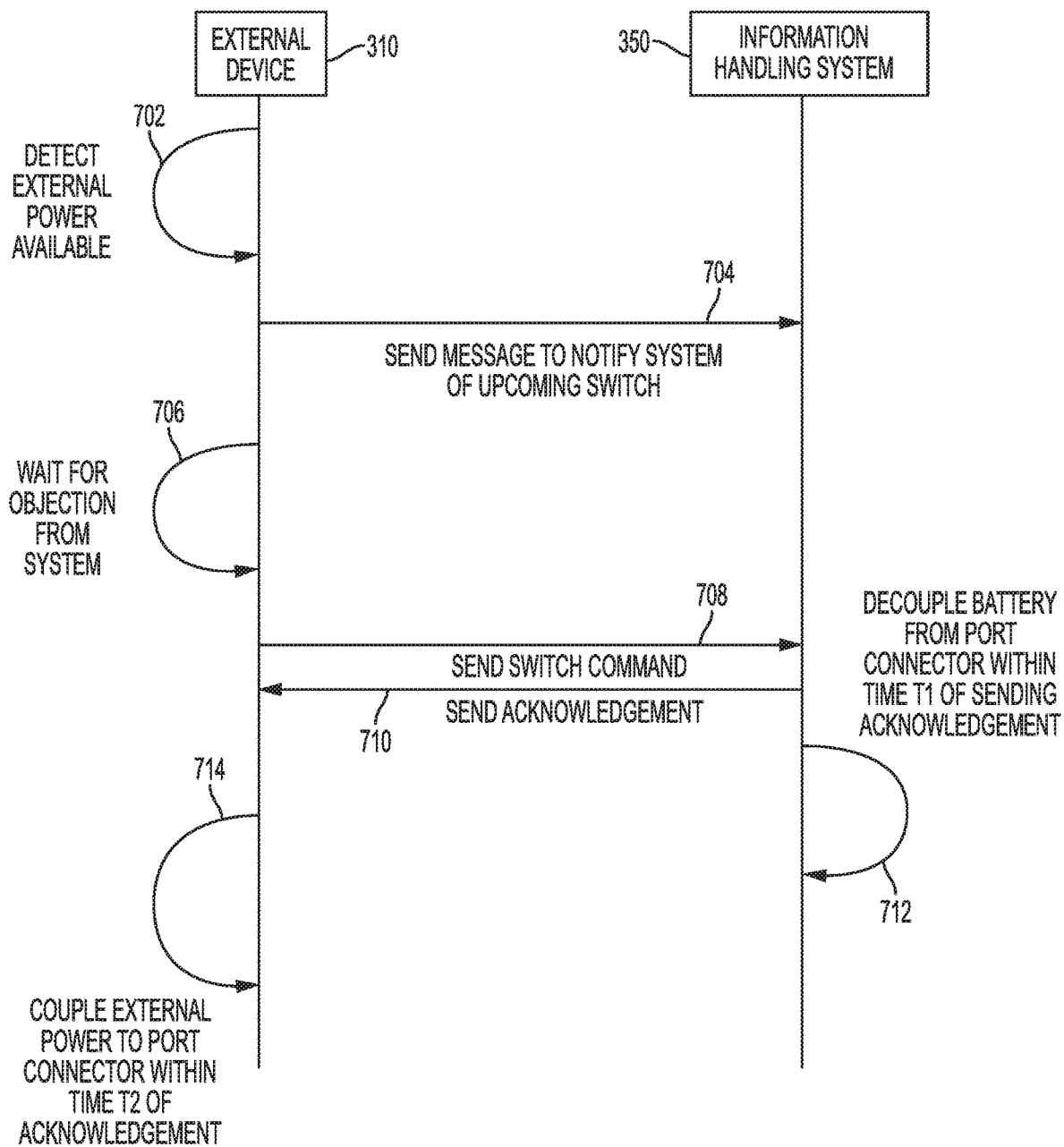
FIG. 7 is a timing diagram illustrating a transition of power for the external device from the attached system to an external power supply according to some embodiments of the disclosure.

An example transition process for switching from the information handling system acting as a power supply for the external device to acting as a power sink for the external device is shown in FIG. 7. FIG. 7 is a timing diagram illustrating a transition of power for the external device from the attached system to an external power supply according to some embodiments of the disclosure. Beginning at time 702, the device 310 may detect external power has become available. Then, at time 704, a message is sent to the system 350 to notify the system 350 of the upcoming switch from acting as a power supply to acting as a power sink. A time period 706 after time 704 may be provided by the device 310 to receive an objection from the system 350 to cancel or delay the upcoming switch. If no objection is received after a certain time period, then the device 310 may send a switch command to the system 350 at time 708. The system 350 may respond with an acknowledgement at time 710. The time 710 of the acknowledgement may be used as a baseline for later actions such that appropriate timing is achieved. A time t1 after sending the acknowledgement, the system 350 may decouple the battery 356 from the port connector 304 at time 712. For example, the port controller 390 may cause the acknowledgement message to be sent through port 304 using an I2C bus and then time t1 later send an I2C command to I2C-to-GPIO device 392. The device 392 converts the I2C command to a signal transmitted to gate logic 396, which changes the switches 382 and 384 into a non-conducting state. A time t2 after the acknowledgement is received by the device 310, the device 310 may couple external power to the port connector. For example, port controller 342 may control gate logic 340 to change switches 332 and 334 to a non-conducting state and EC/BIOS 344 may send an enable signal to switches 322, 324, 326, and 328 to change to a conducting state. Power then flows from the connector 312 through power path 320 to port 302.

The schematic flow chart diagrams of FIG. 2 and FIG. 7 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. A method, comprising:
   receiving, by an external device from an information handling system attached through a port connector, power for operating the external device;
   detecting, by the external device, an availability of external power for operating the external device; and
   transitioning, by the external device, from receiving power from the attached information handling system to receiving power from the external power, wherein the step of transitioning comprises:
   transmitting, by the external device, a message to the attached information handling system of a switch from acting as a power supply for the external device to acting as a power sink for the external device;
   receiving, by the external device, an acknowledgement of the message from the attached information handling system; and
   activating, by the external device, a power path for the external power after a first predetermined time period, the first predetermined time period being a predetermined time period after receiving the acknowledgement,
   wherein the first predetermined time period terminates after termination of a second predetermined time period, the second predetermined time period being a predetermined time period between a transmission of the acknowledgement by the information handling system and disconnection of a power source of the information handling system from a port connector of the information handling system connected to the port connector of the external device.

2. The method of claim 1, wherein the step of transmitting a message comprises transmitting an instruction through the port connector to the information handling system simultaneously with power transfer from the attached information handling system to the external device.

3. The method of claim 1, wherein the step of transmitting a message to the attached information handling system comprises transmitting the message through a connector to the information handling system.

4. The method of claim 3, wherein the step of transmitting a message comprises transmitting an I2C command.

5. The method of claim 1, wherein the step of transitioning comprises delaying after transmitting the message to receive, by the external device, a message from the attached information handling system to cancel the switch from power supply to power sink.

6. The method of claim 1, wherein the step of receiving power from the attached information handling system comprises receiving power from a source higher than 5 Volts.

7. The method of claim 1, wherein the step of detecting an availability of external power comprises comparing a power supply identifier (PSID) of the external power to a known PSID.

8. An apparatus, comprising:
a port connector configured to attach to an information handling system and configured to provide a power path and a data path between the apparatus and the attached information handling system;
an external power connector;
a power path coupled between the external power connector and the port connector, wherein the power path comprises at least one switch controlled by an enable signal to apply power from the external power connector to the port connector;
a port controller coupled to the port connector and configured to control operation of the power path, wherein the port controller is configured to perform steps comprising:
transmitting a message to the attached information handling system of a switch from acting as a power supply for the external device to acting as a power sink for the external device;
receiving an acknowledgement of the message from the attached information handling system; and
activating the power path for the external power a first predetermined time period, the first predetermined time period being a predetermined time period after receiving the acknowledgement using the enable signal,
wherein the first predetermined time period terminates after termination of a second predetermined time period, the second predetermined time period being a predetermined time period between a transmission of the acknowledgement by the information handling system and disconnection of a power source of the information handling system from a port connector of the information handling system connected to the port connector of the external device.

9. The apparatus of claim 8, further comprising an embedded controller coupled to the port controller and configured to apply the enable signal to activate the power path.

10. The apparatus of claim 8, further comprising a second power path coupled between the port connector and a system regulator, wherein the second power path comprises at least one switch controlled by gate logic to receive power from the attached information handling system.

11. The apparatus of claim 10, wherein the port connector is configured to activate the gate logic to receive power from the attached information handling system when a loss of power from the external power connector is detected.

12. The apparatus of claim 8, wherein the message comprises an I2C message.

13. The apparatus of claim 8, wherein the external power connector comprises a barrel plug connector.

14. The apparatus of claim 8, wherein the port controller is further configured to detect an availability of external power by comparing a power supply identifier (PSID) of the external power to a known PSID before transmitting a message to the attached information handling system.

15. An information handling system, comprising:
an internal battery;
a charger coupled between the internal battery and an external power connector;
a port connector configured to supply power and data to the information handling system from an external device;
a supply power path from the internal battery to the port connector configured to provide power to the external device, wherein the supply power path comprises at least one switch configured to de-activate the supply power path;
a receive power path from the port connector to the charger configured to receive power from the external device for operating the information handling system; and
a port controller coupled to the port connector and to the at least one switch of the supply power path, wherein the port controller is configured to:
de-activate the supply power path a first predetermined time period after acknowledging a message from the external device to switch from acting as a power supply for the external device to acting as a power sink for the external device; and
activate the receive power path after de-activating the supply power path,
wherein the first predetermined time period terminates before termination of a second predetermined time period, the second predetermined time period being a predetermined time period after receipt of the acknowledgement by the external device.

16. The information handling system of claim 15, wherein the port controller is configured to transmit an acknowledgement message to the port connector through an I2C bus.

17. The information handling system of claim 16, wherein the port controller is configured to transmit the acknowledgement to the external device through the port connector.

18. The information handling system of claim 16, further comprising an I2C-to-GPIO converter coupled between the port controller and the at least one switch of the supply power path and configured to control the at least one switch to de-activate the supply power path the first predetermined time period after the port controller acknowledges the message.

19. The information handling system of claim 16, wherein the at least one switch of the supply power path port comprises a passing MOSFET, and wherein the port controller is configured to pre-bias on the passing MOSFET.

20. The information handling system of claim 19, wherein the at least one switch of the supply power path comprises a blocking MOSFET, and wherein the port controller is configured to turn on the blocking MOSFET upon sensing loss of power in the external device.

* * * * *